(12) United States Patent
Hirata

(10) Patent No.: US 7,820,585 B2
(45) Date of Patent: Oct. 26, 2010

(54) METAL CLUSTER-CARRYING METAL OXIDE SUPPORT AND PROCESS FOR PRODUCTION THEREOF

(75) Inventor: Hirohito Hirata, Shizuoka (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 376 days.

(21) Appl. No.: 11/920,137

(22) PCT Filed: May 11, 2006

(86) PCT No.: PCT/JP2006/309884

§ 371 (c)(1),
(2), (4) Date: Nov. 9, 2007

(87) PCT Pub. No.: WO2006/121205

PCT Pub. Date: Nov. 16, 2006

(65) Prior Publication Data

US 2009/0099017 A1    Apr. 16, 2009

(30) Foreign Application Priority Data

May 11, 2005    (JP) .............................. 2005-138499

(51) Int. Cl.
*B01J 27/125* (2006.01)
(52) U.S. Cl. ..................... 502/261; 977/754; 117/903
(58) Field of Classification Search ........................ None
See application file for complete search history.

(56) References Cited

U.S. PATENT DOCUMENTS 6,288,253 B1 * 9/2001 Manzer et al. ................. 556/9

FOREIGN PATENT DOCUMENTS

JP    A-2002-513047    5/2002

(Continued)

OTHER PUBLICATIONS

M. Zhao, et al., "Dendrimer-Encapsulated Pt Nanoparticles: Synthesis, Characterization, and Applications to Catalysis," *Adv. Materials*, vol. 11, No. 3 (1999), pp. 217-220.

(Continued)

*Primary Examiner*—Melvin C Mayes
*Assistant Examiner*—Sheng Han
(74) *Attorney, Agent, or Firm*—Finnegan, Henderson, Farabow, Garrett & Dunner, LLP

(57)    ABSTRACT

The present invention provides a metal cluster-carrying metal oxide support wherein a metal cluster obtained by use of a dendrimer is prevented from migrating to the surface of support and being sintered, and a process for production thereof. The process for producing the metal cluster-carrying metal oxide support of the present invention comprises (a) coordinating a first metal ion to a dendrimer 10, (b) reducing the first metal ion coordinated to the dendrimer to precipitate a cluster 6a of the first metal in the dendrimer, (c) further coordinating a second metal ion 8 to the dendrimer, and (d) drying and firing the solution containing this dendrimer on a metal oxide support 9, wherein the oxide of the second metal is the same as the metal oxide constituting the metal oxide support, or a metal oxide capable of forming a composite oxide with the metal oxide constituting the metal oxide support. In the metal cluster-carrying metal oxide support of the present invention, the cluster 6a of the first metal is held by the oxide of the second metal 8 on the metal oxide support 9.

7 Claims, 3 Drawing Sheets

FOREIGN PATENT DOCUMENTS

| | | |
|---|---|---|
| JP | 2003-126694 | 5/2003 |
| JP | A-2003-519074 | 6/2003 |
| JP | 2003-181293 | 7/2003 |
| JP | 3466856 | 8/2003 |
| JP | 2003-290658 | 10/2003 |
| JP | 2005-185956 | 7/2005 |
| JP | 2005-238027 | 9/2005 |
| JP | 2005-305300 | 11/2005 |
| JP | 2006-142137 | 6/2006 |
| WO | WO 2004/110930 | 12/2004 |

OTHER PUBLICATIONS

R. M. Crooks, et al., "Dendrimer-Encapsulated Metal Nanoparticles: Synthesis, Characterization, and Applications to Catalysis," *Accts. Clin. Res.*, vol. 34, No. 3 (Mar. 2001), pp. 181-190.

H. Ye, et al., "Synthesis, Characterization, and Surface Immobilization of Platinum and Palladium Nanoparticles Encapsulated within Amine-Terminated Poly(amidoamine) Dendrimers," *Langmuir* 2004, 20, 2915-2920.

L. Sun, et al., "Dendrimer-Mediated Immobilization of Catalytic Nanoparticles on Flat, Solid Supports," *Langmuir* 2002, 18, 8231-8236.

* cited by examiner

METAL CLUSTER-CARRYING METAL OXIDE SUPPORT AND PROCESS FOR PRODUCTION THEREOF

TECHNICAL FIELD

The present invention relates to a metal cluster-carrying metal oxide support and a process for production thereof. More specifically, the present invention relates to a metal cluster-carrying metal oxide support used as a catalyst, particularly as a catalyst for the purification of exhaust gas, and a process for production thereof.

RELATED ART

Exhaust gas, particularly exhaust gas from an internal combustion engine such as an automobile engine, contains nitrogen oxide ($NO_x$), carbon monoxide (CO), hydrocarbon (HC) and the like. These substances are generally released into the atmosphere after purification with an exhaust gas-purifying catalyst capable of oxidizing CO and HC along with reducing $NO_x$.

In such an exhaust gas-purifying catalyst, a catalyst metal, particularly a noble metal such as platinum (Pt), rhodium (Rh) and palladium (Pd), is used in order to accelerate the reaction for purifying the exhaust gas. Such catalytic activity is provided by the surface of the catalyst metal. Therefore, in order to increase the surface area of the catalyst metal, a fine particulate catalyst metal is supported on a porous metal oxide support such as γ-alumina.

For the production of such a fine particulate catalyst metal, various methods have been employed. Generally, a metal oxide support is impregnated with a metal salt solution, dried and fired, whereby a metal oxide support having a fine particulate catalyst metal supported thereon is obtained.

In order to provide a fine particulate metal, particularly catalyst metal, a technique using a dendrimer has been proposed, wherein a metal ion is coordinated to a dendrimer, and then by reducing the metal ion coordinated, a fine metal cluster is precipitated in the dendrimer (see, M. Crooks et al., Advanced Materials, 11, 217-220 (1999); M. Crooks et al., Accounts Chemical Research, 34, 181-190 (2001); M. Crooks et al., Langmuir, 20, 2915-2920 (2004); and M. Crooks et al., Langmuir, 18, 8231-8236 (2002)).

In the case of obtaining a metal cluster by using a dendrimer, the number of atoms in the obtained metal cluster can be controlled with high uniformity (see, particularly M. Crooks et al., (2004), above).

However, even in the case where a fine metal cluster is precipitated in the dendrimer, when the thus-prepared dendrimer holding a metal cluster therein is deposited on the surface of support and heated in an oxidative atmosphere to oxidize and thereby remove the dendrimer molecule, the metal cluster migrates on the metal support and is sintered resulting in a relatively large particle (see, M. Crooks et al., (2002), above).

Incidentally, Japanese National Patent Publication No. 2003-519074 discloses a method wherein a colloid particle such as cerium, zirconium and titanium colloidal particles is immobilized by a template agent, and the template agent is removed by firing or the like to form a mesoporous body such as cerium oxide mesoporous body. The template agent used includes a nonionic surfactant of block copolymer type, such as poly(ethylene oxide)-poly(propylene oxide)-poly(ethylene oxide) triblock copolymer, and graft poly(ethylene oxide) copolymer.

Also, Japanese National Patent Publication No. 2002-513047 discloses a method wherein a higher generation dendrimer and a monomer are reacted to cover the surface of the higher generation dendrimer by the monomer, crosslinkable portions of adjacent monomers are crosslinked to form a crosslinked outer shell structure, the unstable bond of the dendrimer in the inside of the outer shell structure is disconnected to remove the dendrimer from the inside of the outer shell structure, and thereby a capsule-like supermolecular structural body consisting of the outer shell structure is formed. It is also disclosed that a small molecule is inserted into the capsule-like supermolecular structural body.

The present invention provides a metal cluster-carrying metal oxide support and a process for production thereof, wherein a metal cluster obtained with use of a dendrimer is prevented from migrating on the surface of support and thereby being sintered.

DISCLOSURE OF THE INVENTION

The process for producing a metal cluster-carrying metal oxide support of the present invention comprises (a) adding an ion of a first metal to a dendrimer-containing solution to coordinate the first metal ion to the dendrimer, (b) adding a reducing agent to the solution obtained in the step (a) to reduce the first metal ion coordinated to the dendrimer, and precipitate a cluster of the first metal in the dendrimer, (c) adding an ion of a second metal to the solution obtained in the step (b) to coordinate the second metal ion to the dendrimer holding the cluster of the first metal, and (d) drying and firing the solution obtained in the step (c) on a metal oxide support to deposit the cluster of the first metal and an oxide of the second metal on the metal oxide support. The oxide of the second metal is the same metal oxide as the metal oxide constituting the metal oxide support, or a metal oxide capable of forming a composite oxide with the metal oxide constituting the metal oxide support.

According to the method of the present invention, the oxide of the second metal can be located in the periphery of the cluster of the first metal on the metal oxide support. The oxide of the second metal is the same metal oxide as the metal oxide constituting the metal oxide support, or a metal oxide capable of forming a composite oxide with the metal oxide constituting the metal oxide support, i.e. a metal oxide having high affinity for the metal oxide constituting the metal oxide support. Accordingly, the oxide of the second metal in the periphery of the cluster of the first metal is bound to the metal oxide support, so that the cluster of the first metal can be physically prevented from surface movement on the metal oxide support and in turn, sintering of the cluster of the first metal and resulting particle growth can be suppressed. Also, in the method of the present invention, an ion of a second metal is coordinated to the dendrimer, so that, by controlling the amount of the oxide of second metal located in the periphery of the cluster of the first metal, the cluster of the first metal can be prevented from the oxide of the second metal inhibiting the property of the cluster of the first metal, such as catalytic activity.

In the metal cluster-carrying metal oxide support of the present invention, a cluster of a first metal is held by an oxide of a second metal on the metal oxide support, and the oxide of the second metal is the same metal oxide as the metal oxide constituting the metal oxide support, or a metal oxide capable of forming a composite oxide with the metal oxide constituting the metal oxide support.

In the metal cluster-carrying metal oxide support of the present invention, the oxide of the second metal is the same metal oxide as the metal oxide constituting the metal oxide support, or a metal oxide capable of forming a composite oxide with the metal oxide constituting the metal oxide support, i.e. a metal oxide having high affinity for the metal oxide constituting the metal oxide support. Accordingly, the oxide of the second metal in the periphery of the cluster of the first metal is bound to the metal oxide support, so that the cluster of the first metal can be physically prevented from surface movement on the metal oxide support and in turn, sintering of the cluster of the first metal and resulting particle growth can be suppressed.

In one embodiment of the metal cluster-carrying metal oxide support and the process for production thereof of the present invention, the first metal is selected from the group consisting of platinum, gold, palladium, rhodium and a combination thereof.

According to this embodiment, the first metal can be easily reduced by a reducing agent, and when the metal cluster-carrying metal oxide support is used as a catalyst, good catalytic activity by virtue of a cluster of this metal can be provided.

In one embodiment of the metal cluster-carrying metal oxide support and the process for production thereof of the present invention, the metal constituting the metal oxide support and the second metal both are aluminum. In another embodiment of the metal cluster-carrying metal oxide support and the process for production thereof of the present invention, the metal constituting the metal oxide support and the second metal each is selected from the group consisting of cerium, zirconium and a combination thereof.

According to these embodiments, the affinity between the oxide of the second metal and the metal oxide support is high, so that the oxide of the second metal can be successfully bound to the metal oxide support and in turn, movement of the cluster of the first metal can be successfully prevented by the oxide of the second metal bound to the metal oxide support.

In one embodiment of the metal cluster-carrying metal oxide support and the process for production thereof of the present invention, the cluster of the first metal has from 2 to 1,000 metal atoms.

In one embodiment of the process for producing a metal cluster-carrying metal oxide support of the present invention, the dendrimer is a second to seventh generation dendrimer.

BEST MODE FOR CARRYING OUT THE INVENTION

The metal cluster-carrying metal oxide support and the process for production thereof of the present invention are described below by referring to FIGS. 1 to 6. However, the following description is only for explanation, and the present invention is not limited thereto.

<Coordination of Ion of First Metal>

Figure 1:
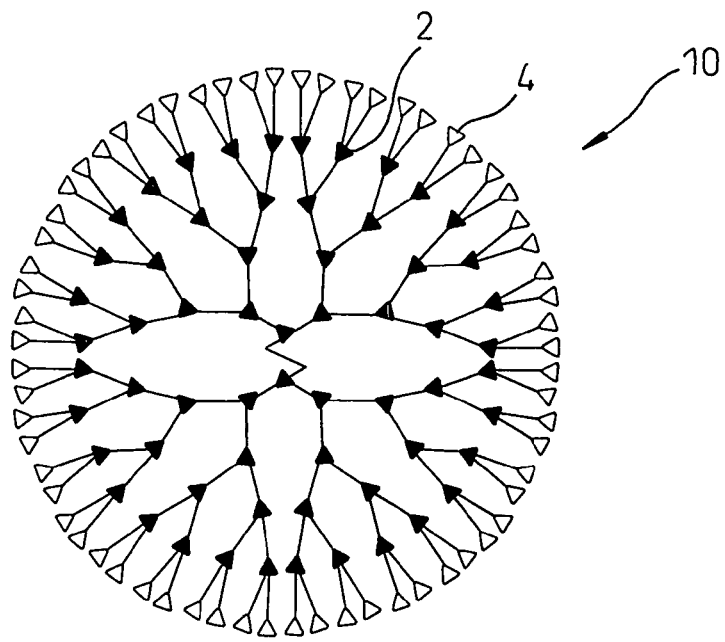
FIG. 1 is a view showing an example of the dendrimer which can be used in the process for producing a metal cluster-carrying metal oxide support of the present invention.
Figure 2:
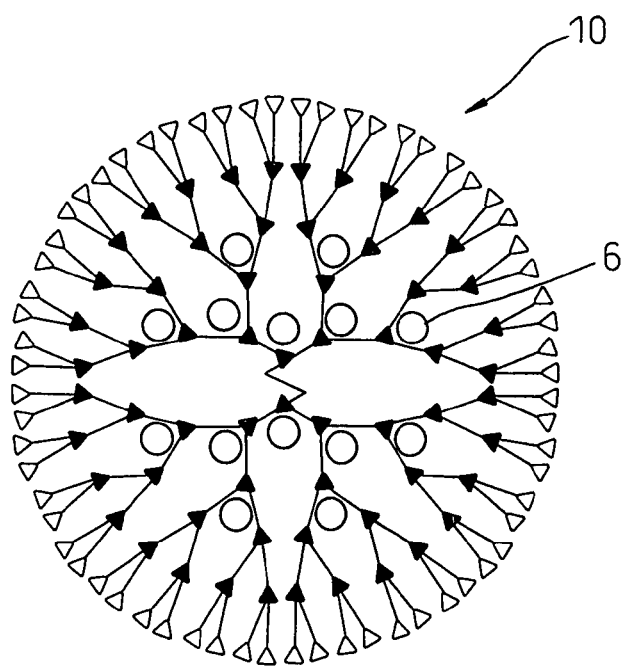
FIG. 2 is a view showing the state of a first metal ion being coordinated to the dendrimer shown in FIG. 1.

In the process for producing a metal cluster-carrying metal oxide support of the present invention, first, an ion 6 of a first metal is added to a solution containing a dendrimer 10 shown in FIG. 1 to coordinate first metal ion 6 to dendrimer 10 as shown in FIG. 2. Dendrimer 10 used has a branch portion-constituting group 2 and a terminal group 4. The coordination of first metal ion 6 to the dendrimer can be achieved, for example, by adding the first metal ion to the dendrimer-containing solution, and then allowing the obtained solution to stand for 1 hour or more specifically 1 day or more.

Regarding the dendrimer used in the present invention, any dendritic polymer (or multibranched polymer compound with a star-like structure) allowing for coordination of a metal ion can be selected. For example, a polyamidoamine-based dendrimer may be selected as the dendrimer used in the present invention. In the polyamidoamine-based dendrimer, referring to the dendrimer 10 shown in FIG. 1, the branch portion 2 is nitrogen (N), and the terminal group 4 is an amino group ($-NH_2$), a carboxy group ($-COO^-$), a hydroxy group ($-OH$) or the like. The dendrimer used in the present invention, particularly the polyamidoamine dendrimer, includes a second to seventh generation dendrimer, specifically a fourth or fifth generation dendrimer, more specifically a fourth generation dendrimer.

The selection of the dendrimer used in the present invention also depends on the intended size of the cluster of the first metal. In other words, the dendrimer used in the present invention must allow for coordination of as many metal ions as required to give the intended cluster of the first metal. However, in the method of the present invention, the metal ion need not be coordinated to all coordination sites of the dendrimer used, but the metal ion may be coordinated only to a part of the coordination sites. For example, in the fourth generation polyamidoamine dendrimer having about 128 coordination sites, the metal ion may be coordinated only to 40 sites. This can be achieved by aging the dendrimer-containing solution after the addition of metal ion to the solution, and thereby equalizing the number of coordinated metal ions among a large number of dendrimers.

The first metal used in the present invention may be any metal. However, the ion of this first metal must be reduced by a reducing agent to produce a metal cluster in the later step. Accordingly, as for the first metal, a metal easy to be reduced by a reducing agent, for example gold, silver, and/or a platinum group metal (ruthenium, rhodium, palladium, osmium, iridium or platinum), is preferably used, i.e., platinum, gold, rhodium and palladium, which are known to have good catalytic activity, can be used as the first metal.

The ion of the first metal may be in any form, for example in the form of solution or solid salt, when it is added to the dendrimer-containing solution.

As described above, in the present invention, the atomic number of the first metal coordinated to the dendrimer is not limited by the kind of the dendrimer, particularly by the number of coordination sites thereof. In other words, the ion of the first metal may be coordinated only to a part of many coordination sites of the dendrimer to obtain a metal cluster having an intended number of first metal atoms. Accordingly, the number of the atom of the first metal coordinated to the dendrimer, i.e. the number of first metal atom in the cluster, is preferably selected according to the usage of the obtained metal cluster-carrying metal oxide support. For example, the cluster of the first metal may have from 2 to 1,000, particularly from 2 to 500, and more particularly from 2 to 100 first metal atoms. Incidentally, in the case where the metal cluster-carrying metal oxide support obtained by the method of the present invention is used as a catalyst, the catalyst performance can be discontinuously changed by varying the number of metal atoms contained in this cluster.

<Precipitation of Cluster of First Metal>

Figure 3:
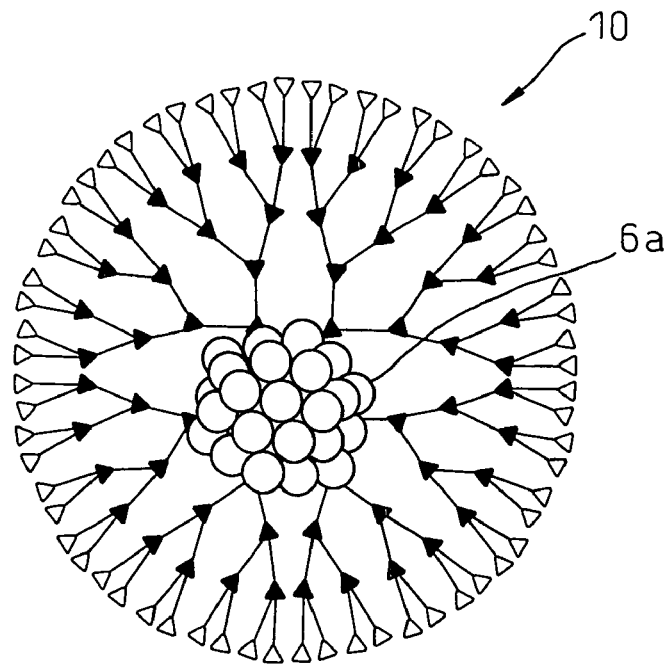
FIG. 3 is a view showing the state of a cluster of the first metal being precipitated from the dendrimer shown in FIG. 2.

In the method of the present invention, the ion 6 of the first metal coordinated to the dendrimer 10 is reduced by adding a reducing agent to the solution containing the dendrimer 10 having coordinated thereto the ion 6 of the first metal, whereby, as shown in FIG. 3, a cluster 6a of the first metal is precipitated in the dendrimer 10.

As for the reducing agent used in the present invention, a reducing agent capable of reducing the first metal ion and precipitating it as a cluster in the dendrimer may be selected. Accordingly, examples of the reducing agent which can be used in the present invention include hydrogen, sodium borohydride ($NaBH_4$), alcohol and like.

<Coordination of Ion of Second Metal>

Figure 4:
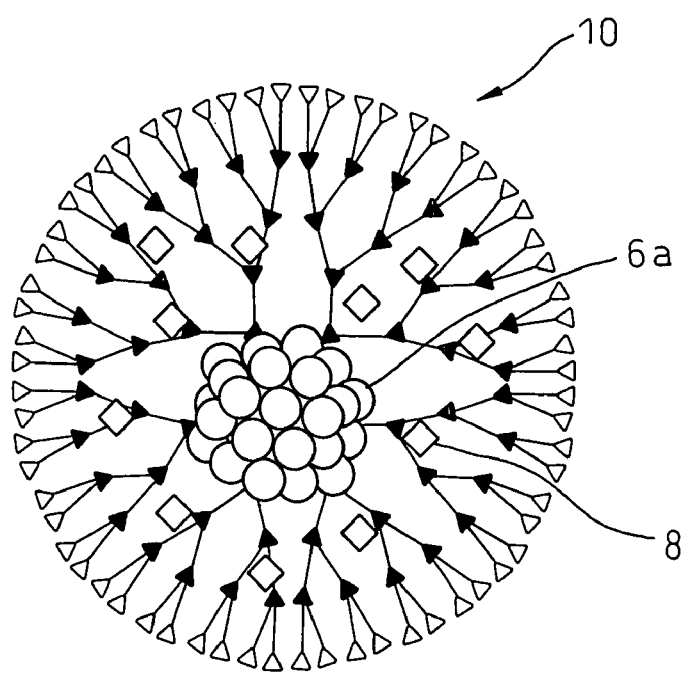
FIG. 4 is a view showing the state of a second metal ion being coordinated to the dendrimer shown in FIG. 3.

In the method of the present invention, an ion 8 of a second metal is added to the solution containing the dendrimer 10 holding the cluster of the first metal 6a, whereby, as shown in FIG. 4, the second metal ion 8 is further coordinated to the dendrimer 10. This coordination of the second metal ion can be achieved, similarly to the coordination of the first metal ion, by adding the ion 8 of the second metal to the solution containing the dendrimer 10, and then allowing the obtained solution to stand for 1 hour or more, and particularly 1 day or more.

The second metal used the present invention is selected such that the oxide of the second metal is the same metal oxide as the metal oxide constituting the metal oxide support, or can form a composite oxide with the metal oxide constituting the metal oxide support. In other words, the second metal is selected such that the oxide thereof has high affinity for the metal oxide support. Accordingly, specifically, when the metal oxide support is an alumina support, the second metal may be aluminum, and when the metal oxide support is a ceria, zirconia or ceria-zirconia solid solution support, the second metal may be a metal selected from the group consisting of cerium, zirconium and a combination thereof.

The ion of the second metal may be any form, for example in the form of solution or solid salt, when it is added to the dendrimer-containing solution.

Similarly to the first metal, in the present invention, the atomic number of the second metal coordinated to the dendrimer is not limited by the kind of the dendrimer, and particularly by the number of coordination sites thereof. Accordingly, the number of the atom of the second metal coordinated to the dendrimer, i.e. the amount of the oxide of the second metal disposed in the periphery of the cluster of the first metal in the obtained metal cluster-carrying metal oxide support, is preferably selected according to the usage of the obtained metal cluster-carrying metal oxide support. In the case where the metal cluster-carrying metal oxide support obtained by the method of the present invention is used as a catalyst, the atomic number of the second metal coordinated to the dendrimer is preferably selected not to inhibit the catalytic activity by the cluster of the first metal while physically restricting the movement of the cluster of the first metal on the metal oxide support.

<Loading of Cluster of the First Metal on Metal Oxide Support>

Figure 5:
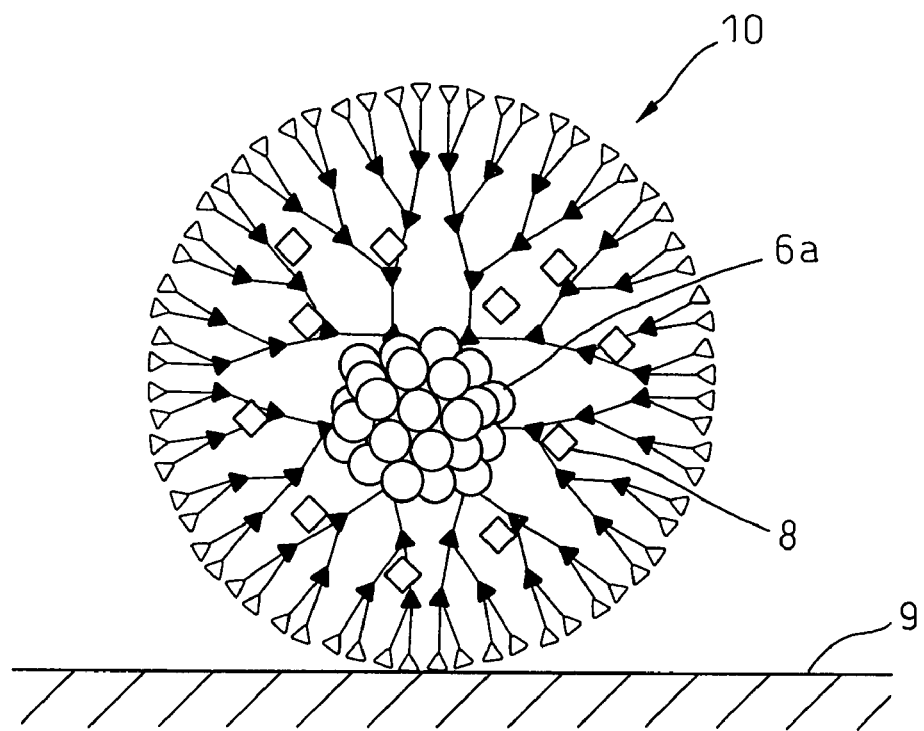
FIG. 5 is a view showing the state of the dendrimer shown in FIG. 4 being carried on a support.
Figure 6:
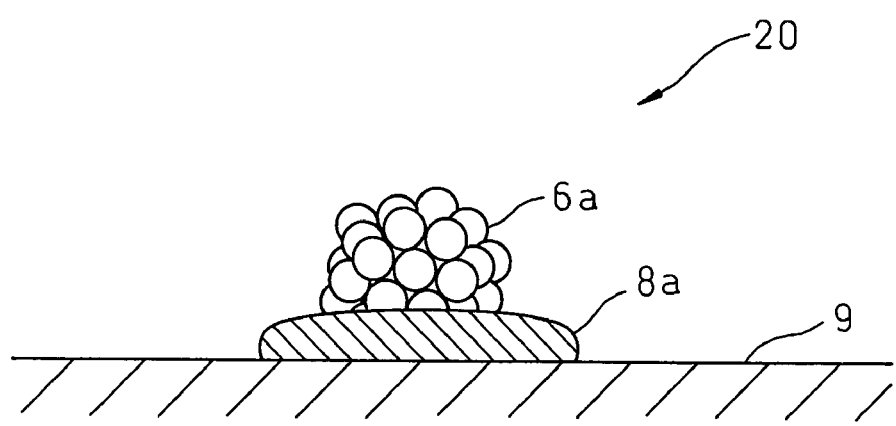
FIG. 6 is a view showing the metal cluster-carrying metal oxide support of the present invention, which can be obtained by firing the dendrimer shown in FIG. 5.

In the method of the present invention, a solution containing the dendrimer 10 having a cluster 6a of the first metal and the ion 8 of the second metal is dried on a metal oxide support 9, whereby, as shown in FIG. 5, the dendrimer 10 is deposited on the metal oxide support 9. Thereafter, the dendrimer 10 is fired on the metal oxide support 9 to obtain a metal cluster-carrying metal oxide support 20 where, as shown in FIG. 6, an oxide 8a of the second metal is located in the periphery of the cluster 6a of the first metal.

The metal oxide support includes a support used a catalyst support, for example a support, particularly a powdery support, of alumina, ceria, zirconia, titania, silica or a combination of thereof.

The temperature and time for the drying and firing can be optionally determined, depending on the first and second metals, dendrimer and metal oxide support used. For example, the drying may be performed at a temperature of 120° C., and the firing may be performed at a temperature of 450 to 550° C.

<Metal Cluster-Carrying Metal Oxide Support>

In the metal cluster-carrying metal oxide support 20 shown in FIG. 6, which is obtained by firing the dendrimer 10 having a cluster 6a of the first metal and the ion of the second metal, the oxide of the second metal 8a is located in the periphery of the cluster 6a of the first metal because the cluster of the first metal 6a and the ion 8 of the second metal exist in the same dendrimer 10.

The present invention is described below by referring to Examples, but the present invention is not limited thereto.

EXAMPLES

Example 1

A hydroxy group-terminated fourth generation polyamidoamine dendrimer (produced by Aldrich, Ethylene Diamine Core PAMAM Dendrimer, Hydroxyl Surface, G=4.0, number of terminal groups: 64) and potassium tetrachloroplatinum(II) ($K_2PtCl_4$) were used as raw materials, and a $Pt_{40}$ cluster was precipitated in the dendrimer by the method similar to that described in M. Crooks et al. (1999), above.

More specifically, the fourth generation polyamidoamine dendrimer and potassium tetrachloroplatinate were mixed such that the number of platinum atoms per one dendrimer became 40, and the resulting mixed solution was stirred at room temperature over 7 days to coordinate 40 platinum ions on average to each dendrimer. To the thus-obtained solution, sodium borohydride ($NaBH_4$) as a reducing agent was added to precipitate a platinum cluster in the dendrimer.

To this solution of the dendrimer having a $Pt_{40}$ cluster precipitated therein, an aluminum nitrate solution was added such that the molar number of aluminum became the same as the molar number of platinum. Subsequently, a γ-alumina support powder was impregnated with the obtained solution to give a supported platinum concentration of 1 mass %, dried at 120° C. for 1 day and fired at 450° C. over 2 hours.

Example 2

The platinum-carrying support of Example 2 was obtained in the same manner as in Example 1, except that a cerium(III) nitrate solution was added in place of the aluminum nitrate solution to provide the same molar number of cerium as the molar number of platinum, and that a ceria ($CeO_2$) support powder was used as the support.

Example 3

The platinum-carrying support of Example 3 was obtained in the same manner as in Example 1, except that a zirconium oxynitrate solution was added in place of the aluminum nitrate solution to provide the same molar number of zirconium as the molar number of platinum, and that a zirconia ($ZrO_2$) support powder was used as the support.

Comparative Example 1

The platinum-carrying support of Comparative Example 1 was obtained in the same manner as in Example 1, except that the aluminum nitrate solution was not added.

Comparative Example 2

The platinum-carrying support of Comparative Example 2 was obtained in the same manner as in Example 2, except that the cerium(III) nitrate solution was not added.

Comparative Example 3

The platinum-carrying support of Comparative Example 3 was obtained in the same manner as in Example 3, except that the zirconium oxynitrate solution was not added.

<Evaluation>

The platinum particle size was evaluated by a CO pulse adsorption method, for as-prepared platinum-carrying supports of Examples and Comparative Examples, and platinum-carrying supports of Examples and Comparative Examples subjected to endurance treatment at 800° C. over 10 hours in air. In the CO pulse adsorption method, with use of an apparatus obtained by adding a low-temperature control unit to a full automatic catalyst gas adsorption measuring apparatus, R6015, manufactured by Okura Riken Inc., the measurement was performed at −60° C. for the ceria support, and at 50° C. for the other supports. The results are shown in Table 1 below.

TABLE 1

Platinum Particle Size Before and After Endurance

| | Pt Particle Size (nm) | |
|---|---|---|
| | Before Endurance | After Endurance |
| Example 1 | 1.17 | 1.85 |
| Example 2 | 1.22 | 1.82 |
| Example 3 | 1.20 | 1.93 |
| Comparative Example 1 | 1.45 | 3.56 |
| Comparative Example 2 | 1.41 | 2.64 |
| Comparative Example 3 | 1.46 | 4.31 |

As understood from Table 1, the platinum-carrying supports of Examples 1 to 3 of the present invention have a small platinum particle size also before endurance, as compared with the platinum-carrying supports of Comparative Example 1 to 3. This is because in the platinum-carrying supports of Examples 1 to 3, surface migration and in turn sintering of the platinum particle are suppressed at the firing for oxidizing and thereby removing the dendrimer to obtain a platinum-carrying support. Also, as understood from Table 1, the effect of preventing sintering of platinum in the platinum-carrying supports of Examples 1 to 3 is clearer in the results after endurance.

In the foregoing pages, the present invention is described by referring to a metal cluster-carrying support used mainly for exhaust gas purification and a process for production thereof, but the metal cluster-carrying support of the present invention can also be used for other uses including catalysts for other purposes.

The invention claimed is:

1. A process for producing a metal cluster-carrying metal oxide support, comprising:
   (a) adding an ion of a first metal to a dendrimer-containing solution to coordinate the ion of the first metal to said dendrimer;
   (b) adding a reducing agent to the solution obtained in the step (a) to reduce the ion of the first metal coordinated to the dendrimer, and precipitate a cluster of the first metal in the dendrimer;
   (c) adding an ion of a second metal to the solution obtained in the step (b) to coordinate the ion of the second metal to the dendrimer holding the cluster of the first metal; and
   (d) drying and firing the solution obtained in step (c) on a metal oxide support to remove the dendrimer and load a cluster of the first metal and an oxide of the second metal on the metal oxide support,
   said oxide of the second metal being the same metal oxide as the metal oxide constituting said metal oxide support, or a metal oxide capable of forming a composite oxide with the metal oxide constituting said metal oxide support.

2. The process according to claim 1, wherein said first metal is selected from the group consisting of platinum, gold, palladium, rhodium and a combination thereof.

3. The process according to claim 1 or 2, wherein the metal constituting said metal oxide support and said second metal both are aluminum.

4. The process according to claim 1 or 2, wherein the metal constituting said metal oxide support and said second metal each is selected from the group consisting of cerium, zirconium and a combination thereof.

5. The process according to claim 1, wherein said cluster of the first metal has from 2 to 1,000 first metal atoms.

6. The process according to claim 1, wherein said dendrimer is a second to seventh generation dendrimer.

7. The process according to claim 6, wherein said dendrimer is a fourth or fifth generation dendrimer.

* * * * *